(12) United States Patent
Miyazaki

(10) Patent No.: US 6,853,170 B2
(45) Date of Patent: Feb. 8, 2005

(54) DC-DC CONVERTER AND DC-DC CONVERTER DRIVE CIRCUIT

(75) Inventor: Takahiro Miyazaki, Hiji-machi (JP)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 10/695,181

(22) Filed: Oct. 28, 2003

(65) Prior Publication Data
US 2004/0113597 A1 Jun. 17, 2004

(30) Foreign Application Priority Data
Oct. 31, 2002 (JP) ....................... 2002-318327

(51) Int. Cl.[7] .............................................. G05F 1/56
(52) U.S. Cl. ...................................................... 323/282
(58) Field of Search ................................ 323/282, 283, 323/284, 285, 351

(56) References Cited

U.S. PATENT DOCUMENTS 6,087,817 A * 7/2000 Varga .......................... 323/282
6,448,752 B1 * 9/2002 Umemoto ..................... 323/288
6,531,853 B2 * 3/2003 Umemoto ..................... 323/282

* cited by examiner

Primary Examiner—Adolf Berhane
(74) Attorney, Agent, or Firm—Alan K. Stewart; W. James Brady, III; Frederick J. Telecky, Jr.

(57) ABSTRACT

The objective of this invention is to provide a DC-DC converter characterized by the fact that by correcting the loop gain corresponding to the switching of the operating mode, the variation in the output voltage that accompanies the switching of the operating mode can be minimized. Loop gain correction section 50 for correcting the gain of the feedback loop that controls output voltage $V_{OUT}$ is used, so that when the operating mode is switched in response to change in the input voltage $V_{IN}$, the gain of the feedback loop is reduced by means of loop gain correction section 50. As a result, the duty ratio of pulse-width modulation signal $V_{PWM1}$ output from pulse-width modulation portion 20 is decreased, and output voltage $V_{OUT}$ is controlled to be reduced. Consequently, the transient rise of output voltage $V_{OUT}$ that accompanies the switching of the operating mode can be avoided, the stability of the output voltage can be improved, and the influence on the load circuit can be prevented.

10 Claims, 8 Drawing Sheets

DC-DC CONVERTER AND DC-DC CONVERTER DRIVE CIRCUIT

FIELD OF THE INVENTION

The present invention pertains to a DC-DC converter, such as a DC-DC converter comprising a switching regulator that switches between back mode and boost mode alternately, as well as a DC-DC converter drive circuit.

BACKGROUND OF THE INVENTION

Switching regulators of the prior art are composed of a switching element and an inductive element, such as a coil, and, by controlling the switching element corresponding to the input voltage and output voltage, it can always supply the desired voltage to the load circuit.

Switching regulators include those that can switch operating modes in accordance with the input voltage. For example, when the input voltage exceeds a prescribed reference level, the regulator enters the so-called back mode. Then, as the input voltage falls below a prescribed reference level, the operating mode is switched to the so-called boost mode. By controlling the switching of the operating mode, it is possible to supply a stable output voltage to the load circuit all the time despite variations in the input voltage. The source of the input voltage in this case is a secondary battery, the output voltage of which falls over time.

FIG. 8 is a circuit diagram illustrating an example of the constitution of a switching regulator that can perform said switching of the operating mode. As shown in the figure, this switching regulator is composed of error detection section 10, pulse-width modulation portion 20, mode control section 30, and switching section 40.

Error detection section 10 is composed of resistive elements R1 and R2 that divide output voltage $V_{OUT}$ with a prescribed voltage division ratio, Gm amplifier GAMP1, and a low-pass filter composed of resistive element R5 and capacitor C1.

Gm amplifier GAMP1 compares the divided voltage obtained by means of resistive elements R1 and R2, that is, the voltage at node N1, with a prescribed reference voltage $V_{REF}$, and outputs error voltage $V_{ER}$ corresponding to the result of said comparison.

Pulse-width modulation portion 20 is composed of npn transistor QN1, resistive elements R3, R4, and comparator COMP1. Said resistive elements R3 and R4 are connected in series between the emitter of transistor QN1 and ground voltage, and error voltage $V_{ER}$ is input to the base of transistor QN1.

Transistor QN1 and resistive elements R3 and R4 form an emitter follower. A voltage derived from error voltage $V_{ER}$ is output from connecting mode N3 of resistive elements R3 and R4 and is input to the in-phase (noninverting) input terminal (+) of comparator COMP1. On the other hand, sawtooth voltage $V_{TR1}$ with a prescribed period is input to the inverting input terminal (−) of comparator COMP1. Consequently, pulse-width modulation signal $V_{PWM1}$ with a duty ratio controlled in correspondence to error voltage $V_{ER}$ is output from comparator COMP1. Here, "duty ratio" refers to the proportion of the period that the pulse-width modulation signal $V_{PWM1}$ is held at the high level.

As shown in the figure, mode control section 30 is composed of PMOS transistor QPM1, NMOS transistor QNM1, buffers DR01, DR02, DR03, DR04, and comparator COMP2.

The gates of transistors QPM1 and QNM1 are both connected to the output terminal of comparator COMP2.

Input voltage $V_{IN}$ is applied to the in-phase (non-inverting) input terminal of comparator COMP2, and reference voltage V2 is input to the inverting input terminal.

Buffers DR01 and DR04 comprise inverters, which output the logical inversion of the input signal. Buffers DR02 and DR03, on the other hand, output the input signal unmodified.

In mode control section 30, when input voltage $V_{IN}$ is higher than reference voltage V2, the output of comparator COMP2 is at the high level. Consequently, PMOS transistor QPM1 is off, while NMOS transistor QNM1 is on. As a result, the input terminals of buffers DR01 and DR02 are kept at the low level. Also, in this case, pulse-width modulation signal $V_{PWM1}$ is applied to the input terminals of buffers DR03 and DR04.

On the other hand, when input voltage $V_{IN}$ is below reference voltage V2, the output of comparator COMP2 is at the low level. Consequently, PMOS transistor QPM1 is on, while NMOS transistor QNM1 is off. As a result, pulse-width modulation signal $V_{PWM1}$ is applied to the input terminals of buffers DR01–DR04.

As shown in the figure, switching section 40 is composed of NMOS transistors QNM2, QNM3, QNM4, QNM5 as the switching elements, and coil L1 as the inductive element. These switching elements and inductive element form a so-called H-type bridge.

The output of buffer DR03 is applied to the gate of transistor QNM2, the output of buffer DR04 is applied to the gate of transistor QNM3, the output of buffer DR01 is applied to the gate of transistor QNM4, and the output of buffer DR02 is applied to the gate of transistor QNM5.

Input voltage $V_{IN}$ is applied to the drain of transistor QNM2, and output voltage $V_{OUT}$ is output from the drain of transistor QNM4. Also, output capacitor $C_{OUT}$ is connected to the drain of transistor QNM4.

The operating mode of the switching regulator with the aforementioned constitution is controlled according to input voltage $V_{IN}$ by means of mode control section 30. For example, when input voltage $V_{IN}$ is higher than reference voltage V2, transistor QNM1 is kept on, and, corresponding to this state, the input terminals of both buffers DR01 and DR02 are kept at the low level. Consequently, the output terminal of buffer DR01 is kept at the high level, and the output terminal of buffer DR02 is kept at the low level. As a result, in switching section 40, transistor QNM4 is kept on, while transistor QNM5 is kept off. In this case, corresponding to pulse-width modulation signal $V_{PWM1}$, transistors QNM2 and QNM3 are controlled to turn on and off alternately. Consequently, the switching regulator operates in back mode.

On the other hand, when input voltage $V_{IN}$ is below reference voltage V2, transistor QPM1 is kept on, while transistor QNM1 is kept off. In this case, pulse-width modulation signal $V_{PWM1}$ is input to the input terminals of each buffer DR01–DR04. Corresponding to this state, as a function of pulse-width modulation signal $V_{PWM1}$, switching section 40 is controlled to alternately turn on transistors QNM2 and QNM5 and turn off transistors QNM3 and QNM4, and vice versa. That is, in this case, the switching regulator works in boost mode.

Thus, by appropriately switching the operating mode of the switching regulator in accordance with input voltage $V_{IN}$, it is possible to supply stable voltage $V_{OUT}$ to the load circuit without influence of variations in the level of input voltage $V_{IN}$ at all times.

However, in the aforementioned conventional DC-DC converter, along with the switching of the operating mode, variation in output voltage $V_{OUT}$ takes place, which is undesirable.

In the switching regulator shown in FIG. 8, corresponding to the error of output voltage $V_{OUT}$ with respect to a prescribed reference voltage, pulse-width modulation signal $V_{PWM1}$ is generated, and the switching element is controlled accordingly. That is, a feedback control loop is formed such that output voltage $V_{OUT}$ is maintained at the desired level. The gain of the feedback control loop (loop gain) varies in company with the switching of the operating mode.

In the following, variations in the output voltage that accompany the switching of the operating mode will be explained with reference to a simulated waveform.

FIG. 9 is a diagram illustrating the waveform of the simulation indicating variations in output voltage $V_{OUT}$ that accompany the switching of the operating mode. The waveform shown in this figure is that obtained when input voltage $V_{IN}$ varies from a level above reference voltage V2 to one below reference V2.

By means of mode control section 30, corresponding to variations in input voltage $V_{IN}$, the voltage at the output terminal of comparator COMP2, that is, node N5, is switched from a high level to a low level. Accompanying this change, the switching regulator switches the operating mode from back mode to boost mode. The gain of the feedback loop that controls output voltage $V_{OUT}$ in back mode is different from that in boost mode, in that the gain in back mode is higher than that of boost mode. Consequently, the gain of the feedback loop should be changed immediately after the switching of the operating mode from the back mode to the boost mode. However, in the circuit shown in FIG. 8, instead changing the gain immediately, it is changed gradually. Consequently, as shown in FIG. 9, immediately after the switching of the operating mode, the voltages of nodes N2 and N3 temporarily overshoot the ideal level. Consequently, the duty ratio of pulse-width modulation signal $V_{PWM1}$ output from comparator COMP1 becomes greater than ideal, and output voltage $V_{OUT}$ temporarily rises and exceeds the desired voltage level immediately after the switching of the operating mode.

From the simulation results shown in FIG. 9, one can see that the output voltage immediately after the switching of the operating mode is about 12% higher than the ideal level. Consequently, due to the switching of the operating mode, the output voltage rises temporarily, which may influence the operation of the load circuit.

The purpose of the present invention is to solve the aforementioned problems of the prior art by providing a DC-DC converter characterized in that the DC-DC converter of the present invention allows switching of the operating mode in accordance with variations in the input voltage, and in that corresponding to the switching of the operating mode, the loop gain is corrected in order to minimize variations in the output voltage that accompany the switching of the operating mode, as well as a DC-DC converter drive circuit.

SUMMARY OF THE INVENTION

In order to realize the aforementioned purpose, the present invention provides a DC-DC converter characterized by the fact that it is comprised of the following: an error detection section that outputs an error signal based on the error between the voltage corresponding to the output voltage and a first reference voltage; a pulse-width modulation section that outputs a pulse-width modulation signal having a duty ratio corresponding to said error signal output from said error detection section; an operating mode control section that compares the input voltage with a second reference voltage and switches the operating mode from a first mode to a second mode corresponding to the result of said comparison; a switching section that performs a switching operation corresponding to said pulse-width modulation signal and holds the output voltage to a prescribed value in the operating mode set by said operating mode control section; and a correction section that corrects the duty ratio of said pulse-width modulation signal and suppresses variations in said output voltage when said operating mode is switched.

Also, according to the present invention, said pulse-width modulation section preferably is comprised of a comparator that compares the modulation reference signal generated corresponding to said error signal with an AC signal having a prescribed period, and outputs said pulse-width modulation signal having the desired duty ratio corresponding to the result of said comparison.

Also, according to the present invention, said correction section preferably adjusts the level of said modulation reference signal corresponding to the signal that controls the switching of said operating mode.

In addition, according to the present invention, said correction section preferably adjusts the level of said modulation reference signal in a prescribed time corresponding to the signal that controls the switching of said operating mode. More specifically, corresponding to the aforementioned signal for controlling the switching of the operating mode, said correction section generates a pulse signal with a prescribed width, and adjusts the level of the modulation reference signal corresponding to said pulse signal.

In order to realize the aforementioned purpose, the present invention provides a drive circuit characterized in that for a DC-DC converter comprising a first switching element connected between a first power source voltage terminal and one terminal of an inductive element, a second switching element connected between said one terminal of said inductive element and a second power source voltage terminal, a third switching element connected between the other terminal of said inductive element and a voltage output terminal, a fourth switching element connected between said other terminal of said inductive element and a second power source voltage terminal, and an output capacitor connected to said voltage output terminal, the drive circuit drives said first, second, third, and fourth switching elements of the DC-DC converter, wherein said drive circuit is comprised of the following: an error output portion that compares the voltage corresponding to the output voltage of said voltage output terminal with a first reference voltage, and outputs an error signal; a pulse-width modulation signal generator that compares the control voltage corresponding to said error signal with an AC signal of prescribed frequency, and generates a pulse-width modulation signal; a mode control signal output unit that compares the voltage input to said first power source voltage terminal with a second reference voltage, and outputs a first mode control signal or a second mode control signal; a driving portion which operates such that in said first mode, said third switching element is turned on while said fourth switching element is turned off, and corresponding to said pulse-width modulation signal, said first switching element and said second switching element are turned on alternately, and in said second mode, corresponding to said pulse-width modulation signal, said first and fourth switching elements and said second and third switching elements are turned on alternately; and a correction section that changes said control voltage corresponding to the variation in said mode control signal.

REFERENCE NUMBERALS AND SYMBOLS AS SHOWN IN THE DRAWINGS

In the figures, 10 represents . . . an error detection section, 20 . . . Pulse-width modulation portion, 30, 30a . . . Mode control section, 40, 40a . . . Switching section, 50, 50a, 50b, 50c . . . Loop gain correction section, $V_{IN}$ . . . Input voltage, $V_{OUT}$ . . . Output voltage

DESCRIPTION OF THE EMBODIMENTS

First Embodiment

Figure 1:
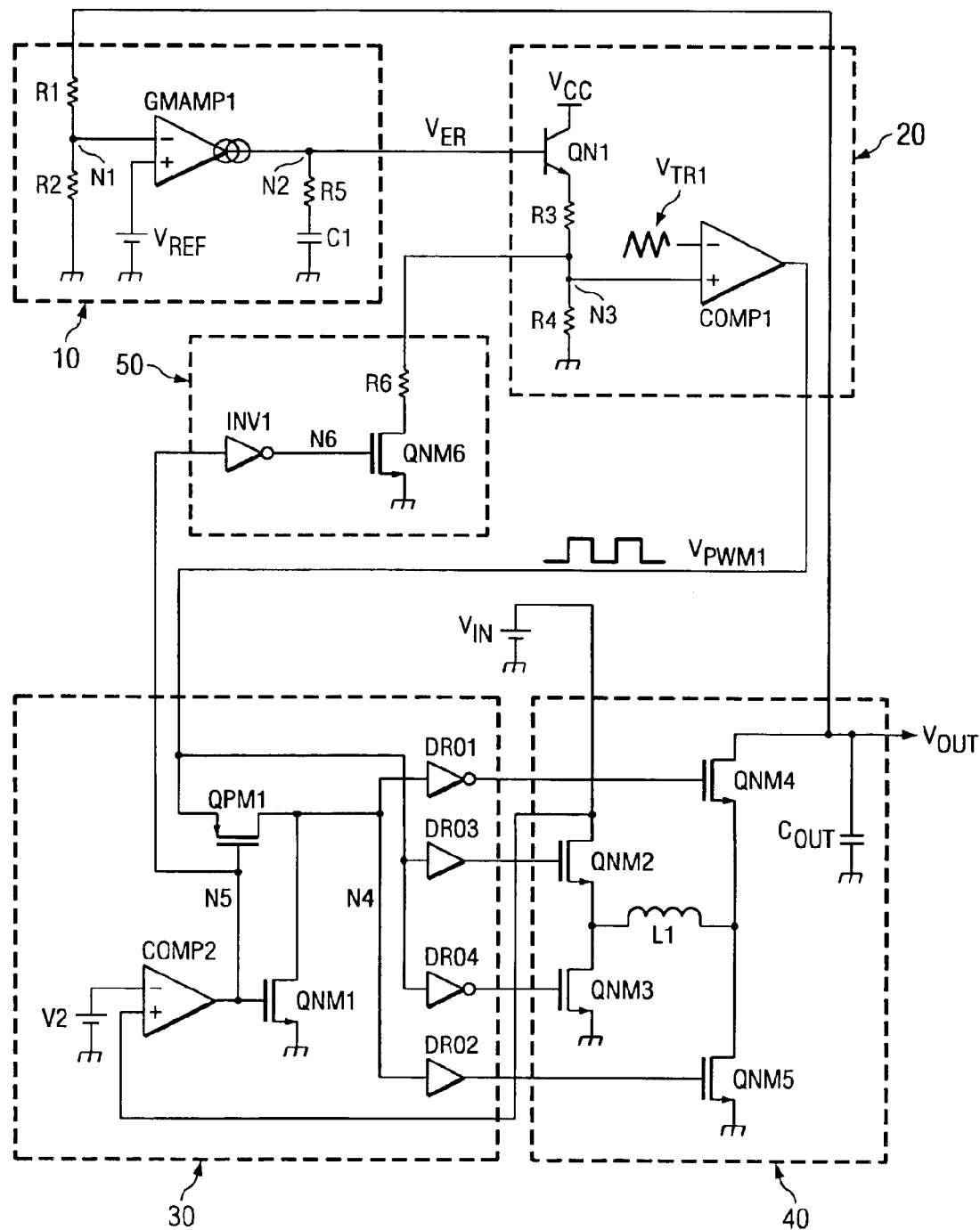
FIG. 1 is a circuit diagram illustrating the first embodiment of the DC-DC converter of the present invention.

FIG. 1 is a circuit diagram illustrating the first embodiment of the DC-DC converter pertaining to the present invention.

As shown in the figure, the DC-DC converter in this embodiment is composed of error detection section 10, pulse-width modulation portion 20, mode control section 30, switching section 40, and loop-gain correction section 50.

The various constituent sections of the DC-DC converter of this embodiment will be explained below.

As shown in FIG. 1, error detection section 10 is composed of resistive elements R1 and R2 that divide output voltage $V_{OUT}$, with a prescribed voltage division ratio, Gm amplifier GMAMP1, as well as resistive element R5 and capacitor C1 which form a low-pass filter.

Gm amplifier GMAMP1 compares the voltage divided by means of resistive elements R1 and R2, that is, the voltage at node N1, with prescribed reference voltage $V_{REF}$, and, in accordance with the result of the comparison, outputs an error current, which is input to the low-pass filter composed of series-connected resistive element R5 and capacitor C1, and error voltage $V_{ER}$ is output.

Pulse-width modulation portion 20 is composed of npn transistor QN1, resistive elements R3, R4, and comparator COMP1. Series-connected resistive elements R3 and R4 are connected between the emitter of transistor QN1 and ground; error voltage $V_{ER}$ is input to the base of transistor QN1, and constant voltage $V_{CC}$ to the collector.

Transistor QN1 and resistive elements R3, R4 form a so-called emitter follower. A voltage derived from error voltage $V_{ER}$ is output from connection mode N3 between resistive elements R3 and R4. The voltage output from node N3 is the modulation reference voltage for performing the pulse-width modulation. The modulation reference voltage is compared with an AC signal at a prescribed frequency, such as sawtooth voltage $V_{TR1}$ in this embodiment, and pulse-width modulation signal $V_{PWM1}$ is output.

More specifically, as shown in FIG. 1, the output voltage at node N3 is input to in-phase (non-inverting) input terminal (+) of comparator COMP1, and sawtooth voltage $V_{TR1}$ with a prescribed period is input to the inverting input terminal (−). Consequently, pulse-width modulation signal $V_{PWM1}$ with its duty ratio controlled corresponding to error voltage $V_{ER}$ is output from the output terminal of comparator COMP1.

As shown in the figure, mode control section 30 is composed of PMOS transistor QPM1, NMOS transistor QNM1, buffers DR01, DR02, DR03, DR04, and comparator COMP2.

The gates of both transistors QPM1 and QNM1 are connected to the output terminal of comparator COMP2. The source of transistor QPM1 is connected to the output terminal of comparator COMP1 of pulse-width modulation portion 20, and its drain to the input terminals of buffers DR01 and DR02. The drain of transistor QNM1 is connected to the drain of transistor QPM1, and its source is grounded.

Input voltage $V_{IN}$ is applied to the in-phase (non-inverting) input terminal of comparator COMP2, and reference voltage V2 is input to the inverting input terminal.

Buffers DR01 and DR04 comprise of inverters, which output the logical inversion of the input signal, while buffers DR02 and DR03 output the input signal unchanged.

When input voltage $V_{IN}$ of mode control section 30 exceeds reference voltage V2, the output of comparator COMP2 goes to the high level. Consequently, PMOS transistor QPM1 is off, and NMOS transistor QNM1 is on. Consequently, the input terminals of buffers DR01 and DR02 are at the low level. Also, in this case, pulse-width modulation signal $V_{PWM1}$ is applied to the input terminals of buffers DR03 and DR04.

On the other hand, when input voltage V1 drops below reference voltage V2, the output of comparator COMP2 is at the low level. Consequently, PMOS transistor QPM1 is on, and NMOS transistor QNM1 is off. As a result, pulse-width modulation signal $V_{PWM1}$ is applied to the input terminals of buffers DR01–DR04.

As shown in the figure, switching section 40 is composed of NMOS transistors QNM2, QNM3, QNM4, QNM5 as switching elements, and coil L1 as an inductive element. These switching elements and inductive element form a so-called H-type bridge.

The output of buffer DR03 is applied to the gate of transistor QNM2, the output of buffer DR04 is applied to the gate of transistor QNM3, the output of buffer DR01 is applied to transistor QNM4, and the output of buffer DR02 is applied to the gate of transistor QNM5.

Input voltage $V_{IN}$ is applied to the drain of transistor QNM2, and output voltage $V_{OUT}$ is output at the drain of transistor QNM4. Also, output capacitor $C_{OUT}$ is connected to the drain of transistor QNM4.

As shown in the figure, loop gain correction section 50 is composed of inverter INV1, NMOS transistor QNM6, and resistive element R6. The input terminal of inverter INV1 is connected to the output terminal of comparator COMP2 of mode control section 30, and the output terminal is connected to the gate of transistor QNM6. The source of transistor QNM6 is grounded, and the drain is connected to node N3 through resistive element R6. Node N3 is the midpoint of the connection between resistive elements R3 and R4 of pulse-width modulation portion 20.

In loop gain correction section 50 with the aforementioned constitution, when the output terminal of comparator COMP2 of mode control section 30, that is, node N5, is at the high level, the output terminal of inverter INV1 is kept at the low level. Consequently, transistor QNM6 is off, and resistive element R6 has no influence on the modulation reference voltage of node N3.

On the other hand, when the output terminal of comparator COMP2 is switched to the low level, the output terminal of inverter INV1 is switched to the high level, and transistor QNM6 turns on. Thus, resistive element R6 is now connected in parallel to resistive element R4 and the resistance between node N3 and ground potential is equal to the resistance of elements R4 and R6, which is less than when resistive element R6 is not connected. Consequently, the voltage at node N3 decreases. As a result, the duty ratio of pulse-width modulation signal $V_{PWM1}$ output from comparator COMP1 also decreases.

The operation of the DC-DC converter in this embodiment with the aforementioned constitution will be explained below.

In the DC-DC converter of this embodiment, output voltage $V_{OUT}$ in error detection circuit 10 is divided by resistive elements R1 and R2, and the divided voltage and reference voltage $V_{REF}$ are input to Gm amplifier GMAMP1. By means of the low-pass filter composed of Gm amplifier GMAMP1, resistive element R5 and capacitor C1, error voltage $V_{ER}$ is output. Said error voltage $V_{ER}$ is input to pulse-width modulation portion 20, and, As a result, pulse-width modulation signal $V_{PWM1}$ is generated with controlled duty ratio. Then, corresponding to the operating mode assigned by mode control section 30, transistors QNM2–QNM5 as switching elements of switching section 40 are controlled to turn on and off by means of pulse-width modulation signal $V_{PWM1}$ so that the desired output voltage $V_{OUT}$ can be output.

As explained above, the DC-DC converter of this embodiment contains a feedback loop that controls output voltage $V_{OUT}$, whereby so the output voltage $V_{OUT}$ is controlled to the desired voltage.

The feedback loop has a prescribed loop gain. Since the loop gain is changed due to the switching of the operating mode, output voltage $V_{OUT}$ temporarily varies immediately after the switching of the operating mode. For example, as explained above, if the loop gain is not corrected, when input voltage $V_{IN}$ falls and the operating mode is switched from the back mode to the boost mode, output voltage $V_{OUT}$ temporarily exceeds the desired level.

In the DC-DC converter of this embodiment, when the operating mode is switched, the gain of the feedback loop is corrected by loop gain correction section 50, so that variations in output voltage $V_{OUT}$ due to the switching of the operating mode can be suppressed. For example, when a transition from the state in which input voltage $V_{IN}$ is above reference voltage V2 to the state in which it is below reference voltage V2 occurs, the output of comparator COMP2 is switched from the high level to the low level. As a result, in loop gain correction section 50, the output signal of inverter INV1 switches from low level to high level, and transistor QNM6 turns on. Consequently, resistive element R6 becomes connected in parallel with resistive element R4.

As a result, the voltage at node N3 falls, and the duty ratio of pulse-width modulation signal $V_{PWM1}$ output from comparator COMP1 decreases. Consequently, in switching section 40 that operates in boost mode, the time that transistors QNM2 and QNM5 are on as switching elements can be reduced, and output voltage $V_{OUT}$ is controlled in the falling direction. Thus, the temporary rise in output voltage $V_{OUT}$ seen that occurs immediately after the switching of the operating mode in the conventional DC-DC converter is suppressed, and even when the operating mode is changed, the output voltage $V_{OUT}$ is kept at nearly the desired level. That is, in the DC-DC converter of this embodiment, by correcting the gain of the feedback loop that controls output voltage $V_{OUT}$ by means of loop gain correction section 50, a temporary rise in output voltage $V_{OUT}$ that accompanies the switching of the operating mode immediately after the operating mode is switched can be prevented and the stability of the output voltage can be improved.

Figure 2:
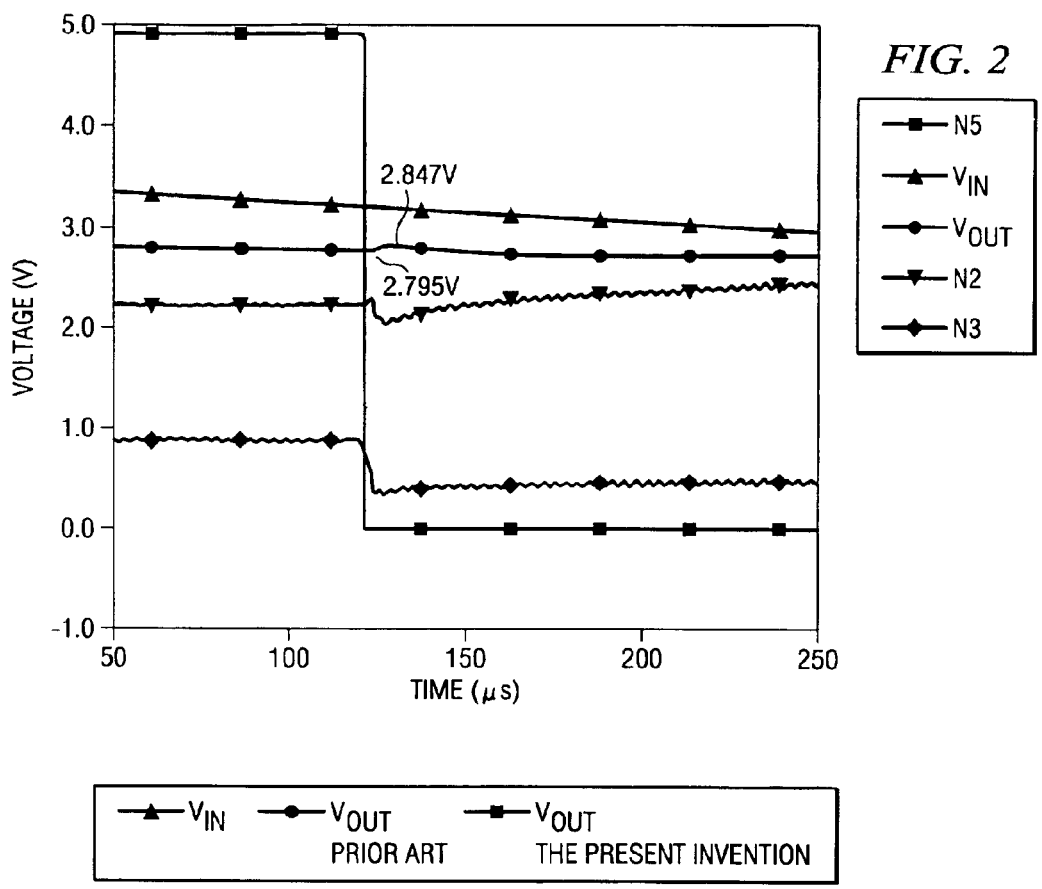
FIG. 2 is a graph illustrating the operation of the DC-DC converter of the first embodiment.

FIG. 2 is a graph of the signal waveforms before and after the switching of the operating mode in the DC-DC converter of this embodiment.

As shown in FIG. 2, the reduction in the level of input signal $V_{IN}$ results in the output of comparator COMP2 of mode control section 30, that is, the voltage at node N5, switching from the high level to the low level, which is accompanied by the operation of loop gain correction section 50, connecting resistive element R6 in parallel with resistive element R4. Consequently, the modulation reference voltage at node N3 of pulse-width modulation portion 20 decreases. As a result, the gain of the feedback loop that controls output voltage $V_{OUT}$ is corrected. Consequently, the rise in output voltage $V_{OUT}$ is suppressed, and even when the operating mode is changed, output voltage $V_{OUT}$ can still be kept nearly constant.

Figure 3:
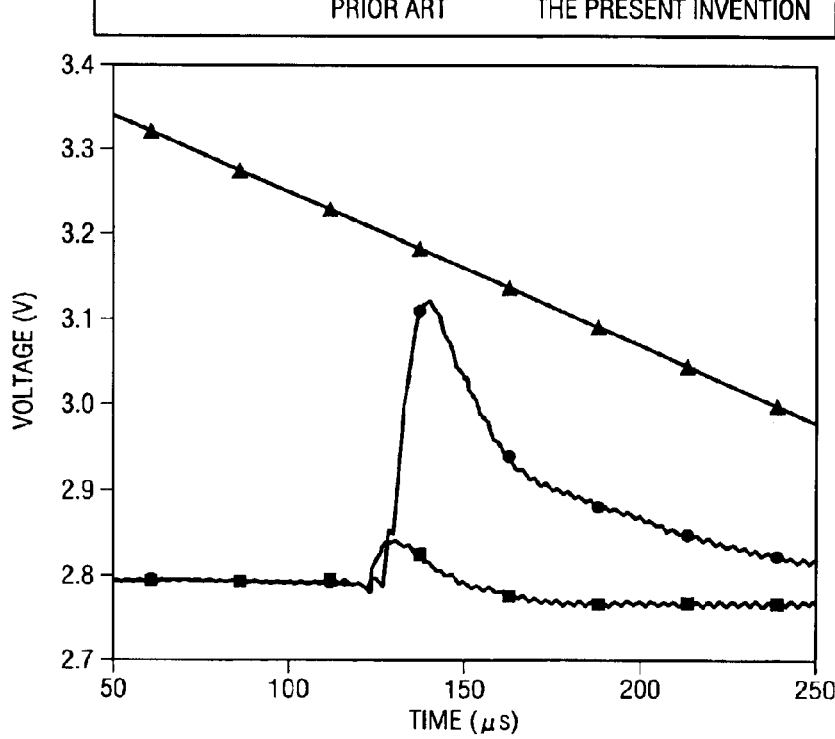
FIG. 3 is a graph illustrating variations in the output voltage of a conventional DC-DC converter that accompany the switching of the operating mode compared with that of the DC-DC converter of the present invention.
Figure 8:
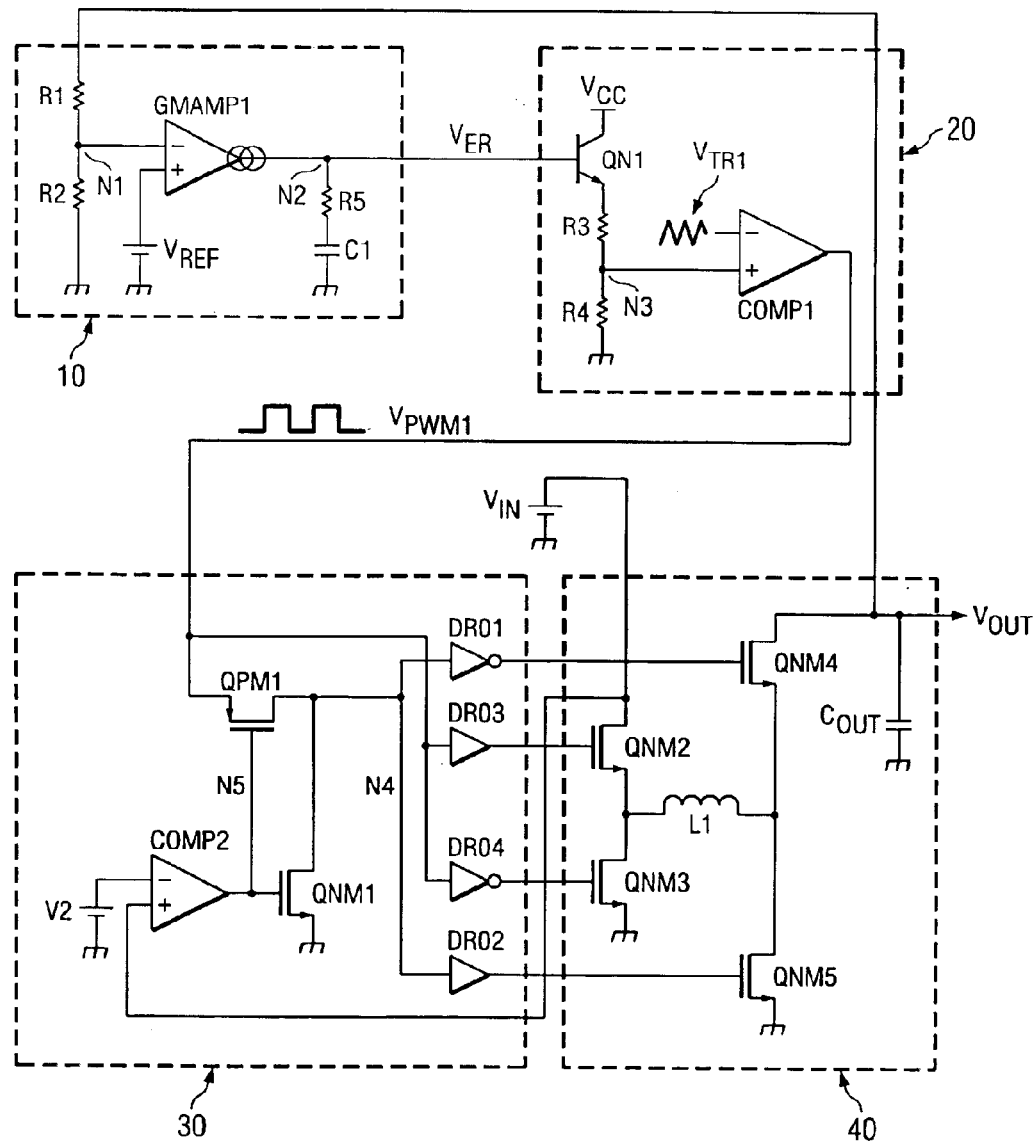
FIG. 8 is a circuit diagram illustrating an example of the constitution of a conventional DC-DC converter.
Figure 9:
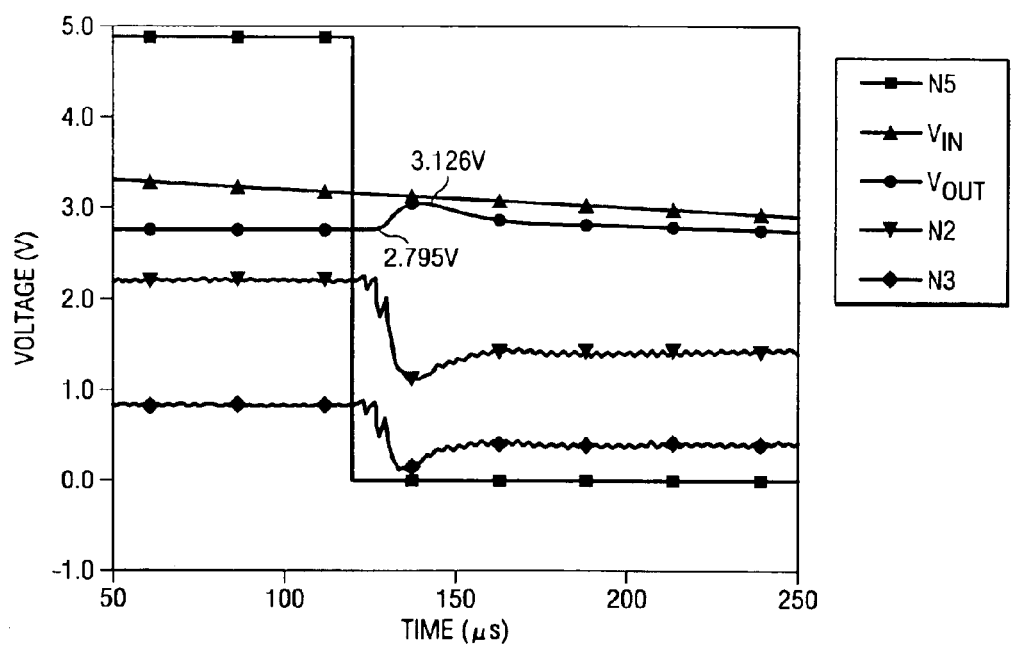
FIG. 9 is a graph illustrating the operation of the conventional DC-DC converter.

For comparison, FIG. 3 is a graph comparing the output voltage of the DC-DC converter of the present invention with that of a conventional DC-DC converter as shown in FIG. 8 before and after the operating mode is switched. As can be seen from FIG. 3, in the conventional DC-DC converter, output voltage $V_{OUT}$ temporarily rises immediately after the operating mode is switched: from about 2.795 V before switching the operating mode to a maximum value of 3.126 V. That is, the peak value of the output voltage is about 11.6% above the ideal level.

On the other hand, with loop gain correction section 50 of the DC-DC converter of the present invention, when the operating mode is switched, resistive element R6 can be connected in parallel with resistive element R4 so that the voltage division ratio of the voltage divider of pulse-width modulation portion 20 can be adjusted to reduce the gain of the feedback loop. As a result, in pulse-width modulation portion 20, the duty ratio of pulse-width modulation signal $V_{PWM1}$ output from comparator COMP1 decreases, and output voltage $V_{OUT}$ is controlled to be reduced. As a result, as shown in FIG. 3, in the DC-DC converter of this embodiment, after the operating mode is switched, output voltage $V_{OUT}$ undergoes only a slight rise to 2.847 V from the ideal value of 2.795 V, and variations in the output voltage are kept down to within 1.9%.

As explained above, in this embodiment, loop gain correction section 50 is used to correct the gain of the feedback loop in order to control output voltage $V_{OUT}$, so that when the operating mode is switched in accordance with input voltage $V_{IN}$, loop gain correction section 50 decreases the gain of the feedback loop. As a result, the duty ratio of pulse-width modulation signal $V_{PWM1}$ output from pulse-width modulation portion 20 is reduced, and output voltage $V_{OUT}$ is controlled to decrease. Consequently, the transient rise in output voltage $V_{OUT}$ that would otherwise accompany the switching of the operating mode can be prevented, the stability of the output voltage can be improved, and adverse effects on the load circuit can be avoided.

Second Embodiment

Figure 4:
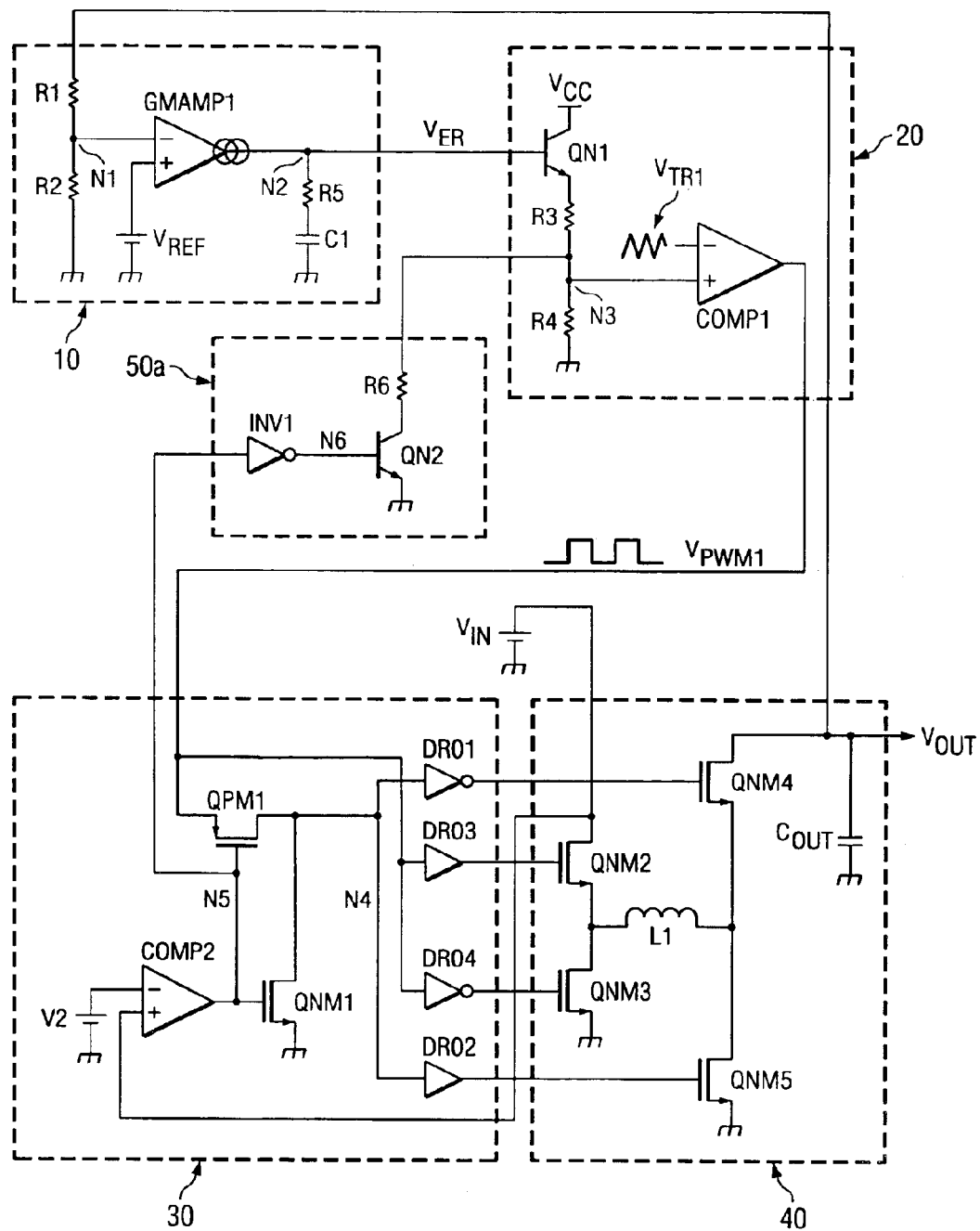
FIG. 4 is a circuit diagram illustrating the DC-DC converter in the second embodiment of the present invention.

FIG. 4 is a circuit diagram illustrating a second embodiment of the DC-DC converter of the present invention.

The DC-DC converter of this embodiment differs from the first embodiment shown in FIG. 1 only in the constitution of the loop gain correction section, with the remaining constituent sections basically unchanged. Consequently, the same part numbers as those used in FIG. 1 are used in FIG. 4. Also, in the following explanation, only loop gain correction section 50a has a constitution unlike that of the first embodiment and will be explained, while explanations for the remaining portions are omitted.

In the DC-DC converter of this embodiment, as shown in FIG. 4, loop gain correction section 50a is composed of inverter INV1, npn transistor QN2, and resistive element R6.

The input terminal of inverter INV1 is connected to the output terminal of comparator COMP2 of mode control section 30, and the output terminal is connected to the base of transistor QN2. The emitter of transistor QN2 is grounded, and the collector of the transistor is connected through resistive element R6 to node N3.

That is, unlike the first embodiment shown in FIG. 1, in the loop gain correction section of the DC-DC converter of this embodiment, instead of NMOS transistor, QN2 is a bipolar npn transistor that is used to control the connection of resistive element R6.

In mode controller 30, when the output of comparator COMP2 is at the high level, the output of inverter INV1 of loop gain correction section 50a is kept at the low level. Consequently, transistor QN2 is off. When the output of comparator COMP2 is switched from high level to low level, the output of inverter INV1 is switched from low level to high level, and transistor QN2 turns on. Consequently, resistive element R6 is connected in parallel with resistive element R4. As a result, the duty ratio of pulse-width modulation signal $V_{PWM1}$ output from comparator COMP1 drops. Thus, the rise of output voltage $V_{OUT}$ is suppressed, the switching of the operating mode is unaffected, and output voltage $V_{OUT}$ can be kept at nearly a constant level.

Third Embodiment

Figure 5:
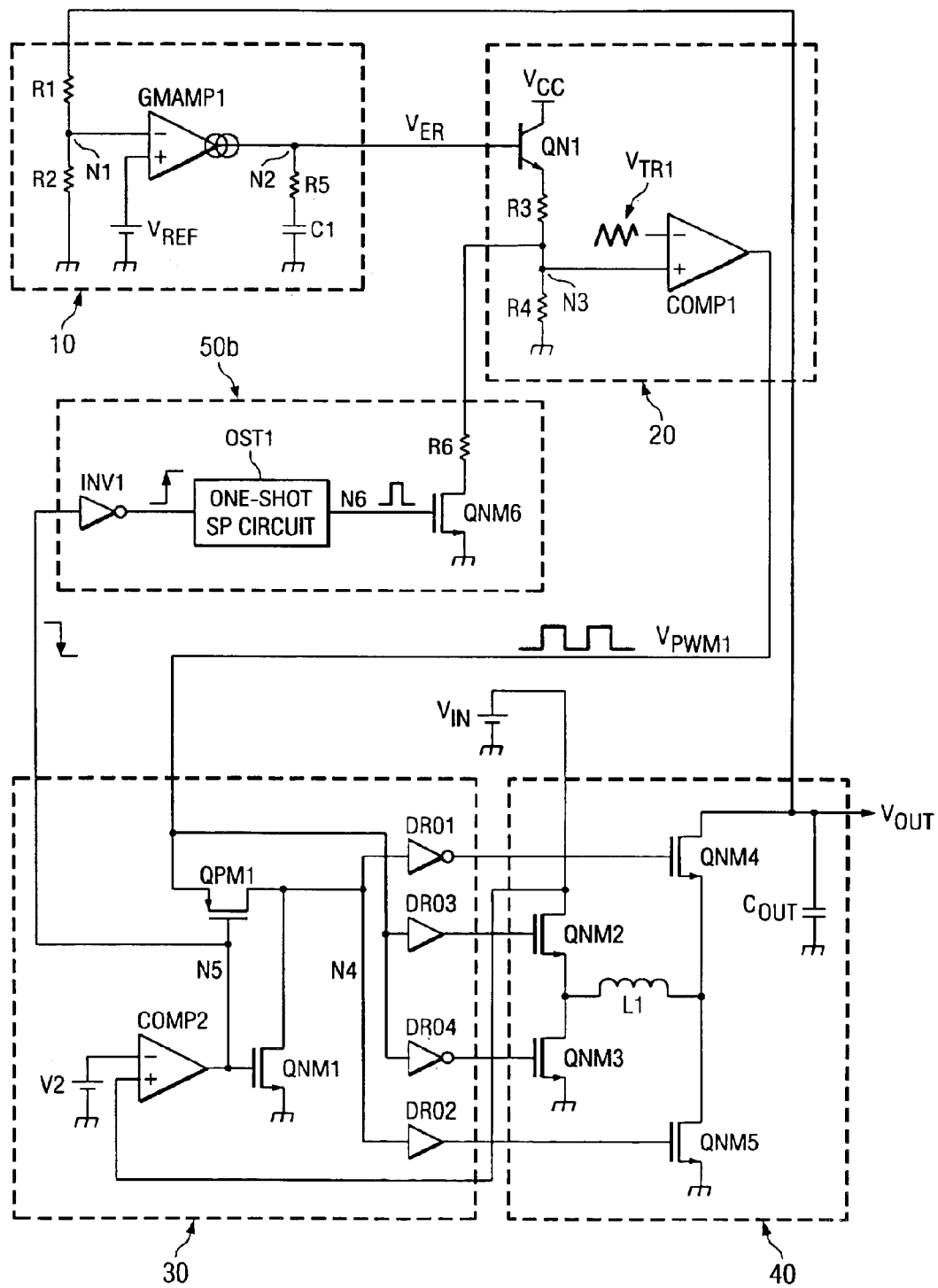
FIG. 5 is a circuit diagram illustrating the DC-DC converter in the third embodiment of the present invention.

FIG. 5 is a circuit diagram illustrating a third embodiment of the DC-DC converter of the present invention.

As shown in the figure, except for loop gain correction section 50b, the constituent sections of the DC-DC converter of this embodiment are almost identical to those of the first embodiment shown in FIG. 1. Only loop gain correction section 50b with a different constitution than of that the first embodiment will be explained below, and the remaining portion of the embodiment will not be explained.

As shown in FIG. 5, loop gain correction section 50b is composed of inverter INV1, one-shot circuit OST1, NMOS transistor QNM6 and resistive element R6.

The input terminal of inverter INV1 is connected to the output terminal of comparator COMP2 of mode controller 30. The output signal of inverter INV1 is input to one-shot circuit OST1, and the output signal of one-shot circuit OST1 is input to the gate of transistor QNM6.

The source of transistor QNM6 is grounded, and its drain is connected through resistive element R6 to node N3.

Loop gain correction section 50b of the DC-DC converter of this embodiment differs from loop gain correction section 50 of the first embodiment by the addition of one-shot circuit OST1. The operation of loop gain correction section 50b of this embodiment will be explained below.

One-shot circuit OST1 is triggered by the rising edge of the input signal, and it outputs pulse signal $S_p$ with a prescribed width.

In loop gain correction section 50b of this embodiment, when the output signal of comparator COMP2 is switched from the high level to the low level, the output signal of inverter INV1 rises from the low level to the high level. As a result, one-shot circuit OST1 is triggered, and pulse signal $S_p$ with a prescribed width is output from the rising edge of the output signal of inverter INV1.

When the operating mode is switched by mode control section 30 as a result of a decrease in input voltage $V_{IN}$, the output signal of comparator COMP2 is switched from the high level to the low level. As a result, the output signal of inverter INV1 rises, and pulse signal $S_p$ with a prescribed width is output from one-shot circuit OST1. When pulse signal $S_p$ is at the high level, transistor QNM6 is on. Consequently, resistive element R6 is connected in parallel with resistive element R4. As a result, the gain of the feedback loop that controls output voltage $V_{OUT}$ decreases, and rise a in output voltage $V_{OUT}$ is suppressed.

As explained above, in the conventional DC-DC converter shown in FIG. 8, output voltage $V_{OUT}$ temporarily rises immediately after the switching of the operating mode. In order to solve this problem, in this embodiment, one-shot circuit OST1 in loop gain correction section 50b is used to ensure that resistive element R6 is connected in parallel with resistive element R4 of pulse-width modulation portion 20 during a prescribed period after the switching of the operating mode, so that the gain of the feedback loop is reduced. As a result, during the period of pulse signal $S_p$ output from one-shot circuit OST1, the duty ratio of pulse-width modulation signal $V_{PWM1}$ is controlled to be decreased, so that the temporary rise in output voltage $V_{OUT}$ is suppressed.

As explained above, in the DC-DC converter of this embodiment, one-shot circuit OST1 is set placed in loop gain correction section 50b, and pulse signal $S_p$ with a prescribed width is output corresponding to the switching of the operating mode. As a result, resistive element R6 is connected in parallel with resistive element R4 of pulse-width modulation portion 20. Consequently, after the switching of the operating mode, during the pulse period of one-shot circuit OST1, the gain of the feedback loop is reduced, and a rise in output voltage $V_{OUT}$ is suppressed. Consequently, the switching of the operating mode has no influence on output voltage $V_{OUT}$ which can be kept approximately constant.

Fourth Embodiment

Figure 6:
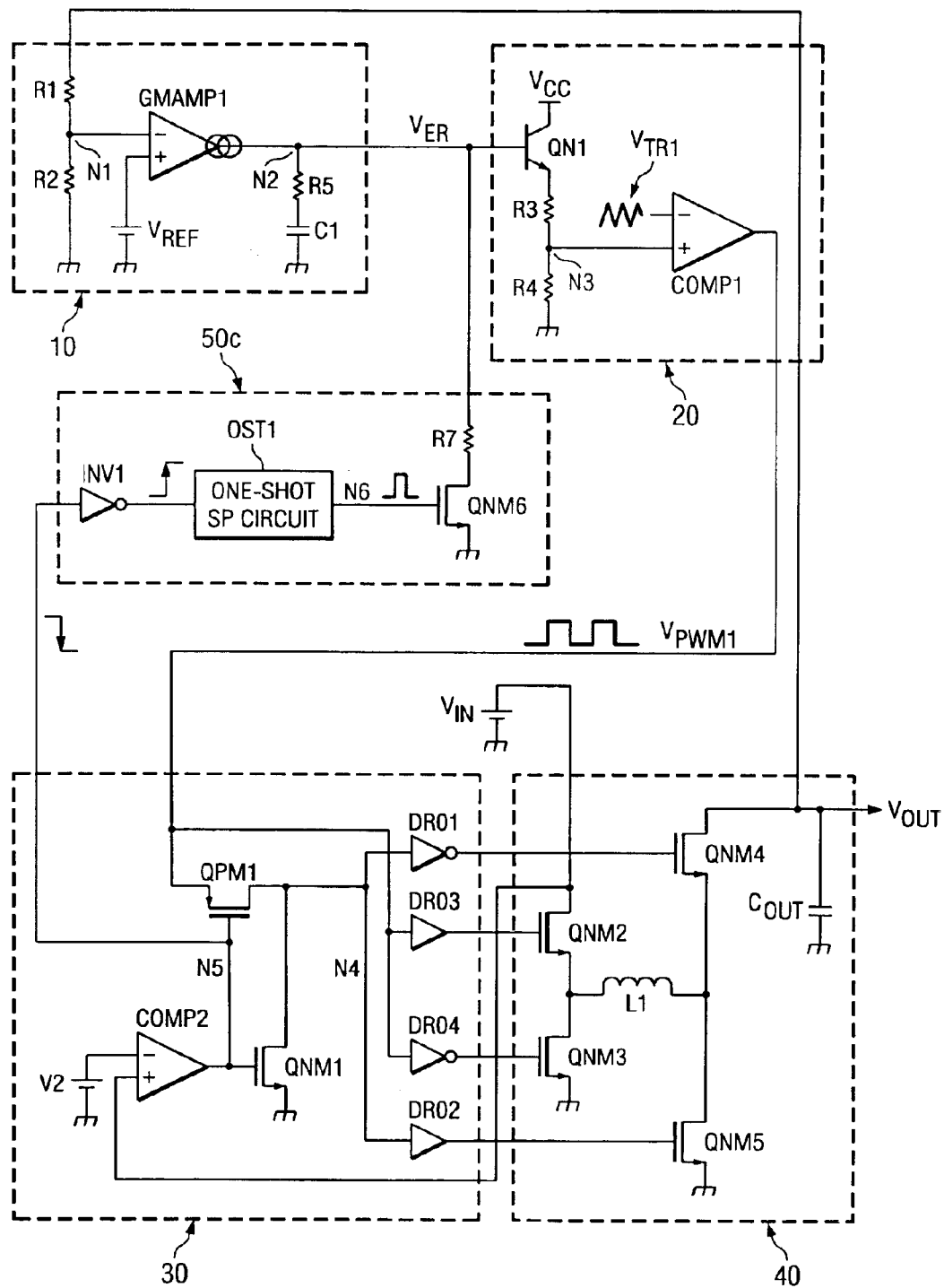
FIG. 6 is a circuit diagram illustrating the DC-DC converter in the fourth embodiment of the present invention.

FIG. 6 is a circuit diagram illustrating a fourth embodiment of the DC-DC converter of the present invention.

As in the said third embodiment, the DC-DC converter of this embodiment also uses one-shot circuit OST1 in the loop gain correction section. However, the connection of resistive element R7 is different in loop gain correction section 50c of this embodiment.

The constitution and operation of loop gain correction section 50c of this embodiment will be explained below.

As shown in FIG. 6, loop gain correction section 50c is composed of inverter INV1, one-shot circuit OST1, NMOS transistor QNM6, and resistive element R7.

The input terminal of inverter INV1 is connected to the output terminal of comparator COMP2 of mode control section 30, and its output terminal is connected to the input terminal of one-shot circuit OST1.

The output terminal of one-shot circuit OST1 is connected to the gate of transistor QNM6.

The source of transistor QNM6 is grounded, and the drain of the transistor is connected via resistive element R7 to node N2.

That is, in loop gain correction section 50c of this embodiment, the end of resistive element R7 that is not connected to the source of transistor QNM6 is connected to node N2 instead of node N3. In this way, this embodiment differs from the third embodiment of the present invention shown in FIG. 5.

When the operating mode is switched by mode control section 30, pulse signal $S_p$ with a prescribed width is output from one-shot circuit OST1 in loop gain correction section 50c of this embodiment. As a result, transistor QNM6 turns on, connecting resistive element R7 between node N2 and ground potential.

In this case, resistive element R7 is connected in parallel with the low-pass filter composed of resistive element R5 and capacitor C1 connected in series between node N2 and ground potential. That is, as the gain of the low-pass filter connected to the output terminal of Gm amplifier GMAMP1 becomes lower, the voltage of error voltage $V_{ER}$ output from node N2 decreases. As a result, in pulse-width modulation portion 20, the voltage at node N3 also decreases, and the duty ratio of pulse-width modulation signal $V_{PWM1}$ output from comparator COMP1 decreases. As a result, the tendency of output voltage $V_{OUT}$ to rise can be suppressed.

As explained above, in the DC-DC converter of this embodiment, the loop gain correction section 50c can be used to reduce the gain of the feedback loop that controls output voltage $V_{OUT}$ when the operating mode is switched. As a result, the transient rise in output voltage $V_{OUT}$ that accompanies the switching of the operating mode is suppressed, and the stability of output voltage $V_{OUT}$ is improved.

Fifth Embodiment

Figure 7:
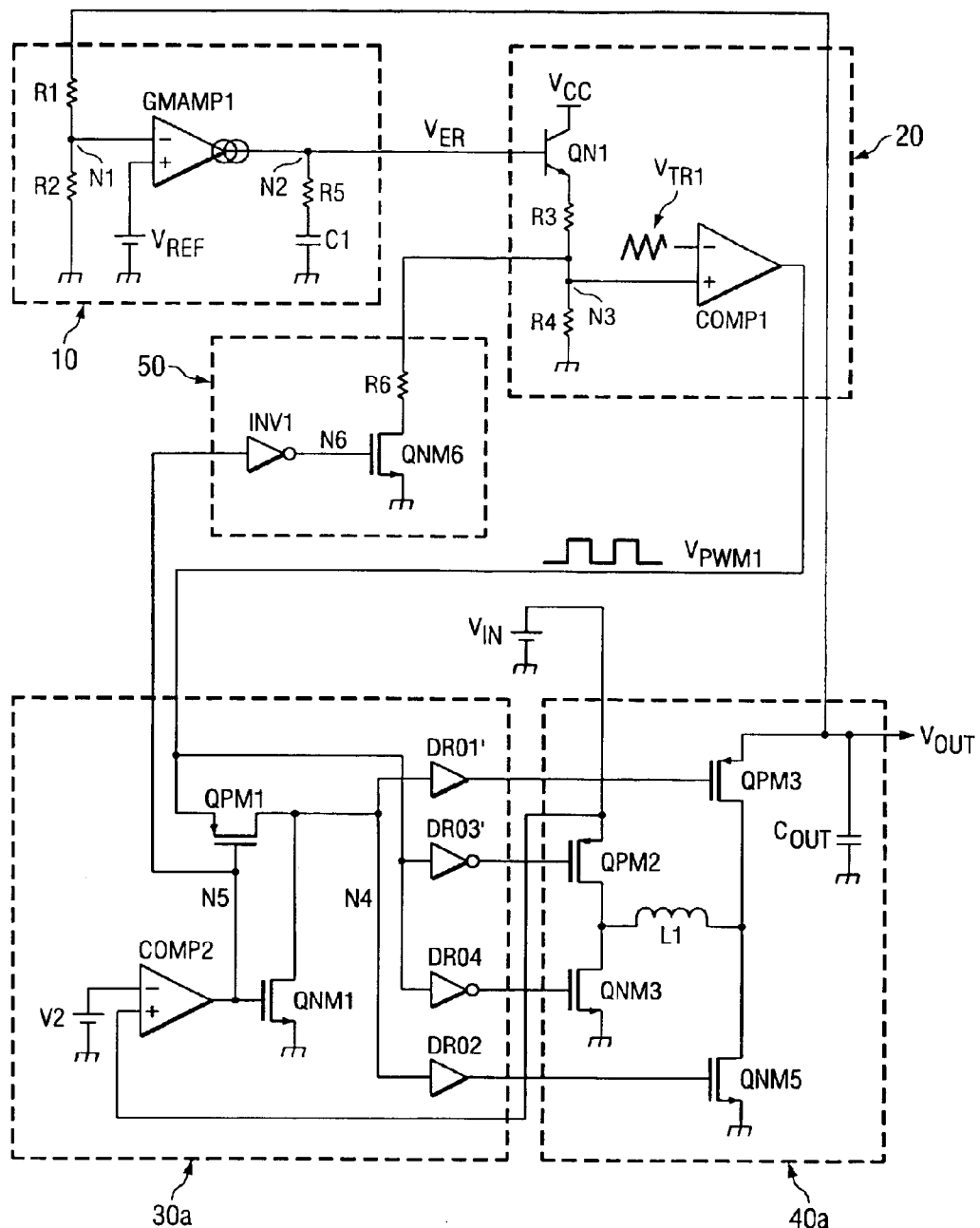
FIG. 7 is a circuit diagram illustrating the DC-DC converter in the fifth embodiment of the present invention.

FIG. 7 is a circuit diagram illustrating a fifth embodiment of the DC-DC converter of the present invention.

As shown in the figure, the DC-DC converter of this embodiment has approximately the same constitution as that of the first embodiment shown in FIG. 1. However, in this embodiment, buffers DR01' and DR03' in mode control section 30a are different than buffers DR01 and DR03 of the first embodiment. Also, in switching section 40a, the switching element controlled by the output signal of buffers DR01' and DR03' is composed of PMOS transistors QPM2 and QPM3.

In mode control section 30a of this embodiment, the signal output by buffer DR01' is the uninverted input signal. On the other hand, buffer DR03' outputs an inverted input signal.

Consequently, in the DC-DC converter of this embodiment, when input voltage $V_{IN}$ is higher than reference voltage V2, in mode control section 30a, the output of comparator COMP2 is kept at the high level. Consequently, transistor QNM1 turns on, and as a result, node N4 is kept at the low level. In this case, the output terminals of buffers DR01' and DR02 are both kept at the low level. Thus, in switching section 40a, transistor QPM3 is kept on, and transistor QNM5 is kept off. Consequently, the DC-DC converter operates in back mode. In this case, corresponding to pulse-width modulation signal $V_{PWM1}$ output from pulse-width modulation portion 20, transistors QPM2 and QNM3 are controlled to turn on and off alternately. Consequently, output voltage $V_{OUT}$ is kept at the desired level.

When input voltage $V_{IN}$ drops below than reference voltage V2, in mode control section 30a, the output signal of comparator COMP2 goes to the low level, and as a result, transistor QNM1 turns off, while transistor QPM1 turns on. Consequently, pulse-width modulation signal $V_{PWM1}$ output from pulse-width modulation portion 20 is input to buffers DR01', DR02, DR03', and DR04. Corresponding to the output signals of these buffers, switching section 40a switches transistors QPM2 and QNM5 on and transistors QPM3 and QNM3 off and vice versa. In addition, based on output voltage $V_{OUT}$ and reference voltage $V_{REF}$, the duty ratio of pulse-width modulation signal $V_{PWM1}$ output from pulse-width modulation portion 20 is controlled by the feedback loop. As a result, output voltage $V_{OUT}$ is kept at the desired level.

In addition, in the DC-DC converter of this embodiment, loop gain correction section 50 is used, so that when the operating mode is switched, loop gain correction section 50 can control the gain of the feedback loop, thereby suppressing the temporary rise in output voltage $V_{OUT}$ due to the switching of the operating mode improving the stability of output voltage $V_{OUT}$.

In addition to the aforementioned embodiments, other constitutions of the DC-DC converter of the present invention may also be adopted. For example, instead of Gm amplifier GmAMP1, a voltage output type differential amplifier can be used in error detection section 10. Also, instead of bipolar transistor QN1, a MOS transistor, such as NMOS transistor, may be used in pulse-width modulation portion 20. In addition, various other modifications can be adopted in the DC-DC converter of the present invention.

As explained above, in the DC-DC converter of the present invention, when the operating mode is switched in correspondence with the input voltage, the gain of the feedback loop that controls the output voltage is corrected so that the transient variation in output voltage due to the switching of the operating mode can be suppressed, the effect of switching the operating mode is eliminated, and a stable output voltage can be supplied to the load circuit at all times, all of which are advantageous effects of the present invention.

What is claimed is:

1. A DC-DC converter comprising:
    an error detection section that outputs an error signal based on the error between the voltage corresponding to the output voltage and a first reference voltage;
    a pulse-width modulation section that outputs a pulse-width modulation signal having a duty ratio corresponding to said error signal output from said error detection section;
    an operating mode control section that compares the input voltage with a second reference voltage and switches the operating mode from a first mode to a second mode corresponding to the result of said comparison;
    a switching section that performs a switching operation corresponding to said pulse-width modulation signal and holds the output voltage to a prescribed value in the operating mode set by said operating mode control section;

and a correction section that corrects the duty ratio of said pulse-width modulation signal and suppresses variations in said output voltage when said operating mode is switched.

2. The DC-DC converter of claim 1 wherein said pulse-width modulating section is comprised of a comparator that compares the modulation reference signal generated corresponding to said error signal with an AC signal having a prescribed period, and outputs said pulse-width modulation signal having the desired duty ratio corresponding to the result of said comparison.

3. The DC-DC converter of claim 2 wherein said correction section adjusts the level of said modulation reference signal corresponding to the signal that controls the switching of the operating mode.

4. The DC-DC converter of claim 2 wherein said correction section adjusts the level of said modulation reference signal in a prescribed time corresponding to the signal that controls the switching of the operating mode.

5. The DC-DC converter of claim 2 wherein said correction section generates a pulse signal of prescribed width, and adjusts the level of said modulation reference signal corresponding to said pulse signal.

6. A DC-DC converter drive circuit comprising:

a first switching element connected between a first power source voltage terminal and one terminal of an inductive element;

a second switching element connected between said one terminal of said inductive element and a second power source voltage terminal;

a third switching element connected between the other terminal of said inductive element and a voltage output terminal;

a fourth switching element connected between said other terminal of said inductive element and a second power source voltage terminal;

an output capacitor connected to said voltage output terminal, the drive circuit drives said first, second, third, and fourth switching elements of the DC-DC converter, wherein said drive circuit comprises:

an error output section that compares the voltage corresponding to the output voltage of said voltage output terminal with a first reference voltage, and outputs an error signal;

a pulse-width modulation signal generator that compares the control voltage corresponding to said error signal with an AC signal of prescribed frequency, and generates a pulse-width modulation signal;

a mode control signal output section that compares the voltage input to said first power source voltage terminal with a second reference voltage, and outputs a first mode control signal or a second mode control signal;

a drive section which operates such that in said first mode, said third switching element is turned on while said fourth switching element is turned off, and, corresponding to said pulse-width modulation signal, said first switching element and said second switching element are turned on alternately, and, in said second mode, corresponding to said pulse-width modulation signal, said first and fourth switching elements and said second and third switching elements are turned on alternately;

and a correction section that changes said control voltage corresponding to variations in said mode control signal.

7. The drive circuit of claim 6 wherein said correction section lowers said control voltage corresponding to a change from said first mode to said second mode.

8. The drive circuit of claim 7 wherein said first mode is the back mode, and said second mode is the boost mode.

9. The drive circuit described in claim 6 wherein said pulse-width modulation signal generator includes a transistor with which said error signal is input to the control terminal, a resistive element that is connected in series with said transistor and generates said control voltage which corresponds to the current sourced by the transistor, and a comparator to which is input said control voltage and a sawtooth signal and that generates said pulse-width modulation signal;

and said correction section has a switching circuit section to which is connected said resistive element and which turns on in response to said mode control signal.

10. The drive circuit described in claim 9 wherein said drive section includes first, second, third and fourth drivers that drive said first, second, third, and fourth switching elements, respectively, and supplies said pulse-width modulation signal only to said first and second drivers when said first mode control signal is input from said mode control signal output section.

* * * * *